April 24, 1951 R. M. HARDGROVE 2,550,066

STEAM GENERATOR

Filed Nov. 29, 1944 9 Sheets-Sheet 1

INVENTOR.
Ralph M. Hardgrove
BY
W. M. Holbrook
ATTORNEY

April 24, 1951 R. M. HARDGROVE 2,550,066

STEAM GENERATOR

Filed Nov. 29, 1944

9 Sheets-Sheet 2

INVENTOR.
Ralph M. Hardgrove

BY

N. M. Holbrook ATTORNEY

April 24, 1951 R. M. HARDGROVE 2,550,066

STEAM GENERATOR

Filed Nov. 29, 1944 9 Sheets-Sheet 3

INVENTOR.

BY Ralph M. Hardgrove

M. Holbrook ATTORNEY

April 24, 1951 R. M. HARDGROVE 2,550,066

STEAM GENERATOR

Filed Nov. 29, 1944 9 Sheets-Sheet 4

INVENTOR.
Ralph M. Hardgrove
BY
W. Holbrook ATTORNEY

April 24, 1951 R. M. HARDGROVE 2,550,066

STEAM GENERATOR

Filed Nov. 29, 1944 9 Sheets-Sheet 5

INVENTOR.

BY Ralph M. Hardgrove

[signature] ATTORNEY

April 24, 1951 R. M. HARDGROVE 2,550,066

STEAM GENERATOR

Filed Nov. 29, 1944 9 Sheets-Sheet 6

INVENTOR
Ralph M. Hardgrove
BY
N. W. Holbrook
ATTORNEY

April 24, 1951 R. M. HARDGROVE 2,550,066

STEAM GENERATOR

Filed Nov. 29, 1944 9 Sheets-Sheet 7

INVENTOR
Ralph M. Hardgrove
BY
R. W. Holbrook
ATTORNEY

April 24, 1951 R. M. HARDGROVE 2,550,066

STEAM GENERATOR

Filed Nov. 29, 1944 9 Sheets-Sheet 8

INVENTOR
Ralph M. Hardgrove
BY
R. M. Holbrook
ATTORNEY

April 24, 1951 R. M. HARDGROVE 2,550,066

STEAM GENERATOR

Filed Nov. 29, 1944 9 Sheets-Sheet 9

INVENTOR
Ralph M. Hardgrove
BY
N.W. Holbrook
ATTORNEY

Patented Apr. 24, 1951 2,550,066

UNITED STATES PATENT OFFICE 2,550,066

STEAM GENERATOR

Ralph M. Hardgrove, Westfield, N. J., assignor to The Babcock & Wilcox Company, Rockleigh, N. J., a corporation of New Jersey Application November 29, 1944, Serial No. 565,602

5 Claims. (Cl. 122—347)

The present invention relates in general to steam generating installations, and it is more particularly concerned with improvements in a steam generator of the water tube type.

The invention is, also, particularly concerned with a water tube steam generator which, because of the particular arrangements of its parts, is adapted to effectively operate as a part of a mobile power plant.

An object of the invention is to provide a steam generator so combined with a railway car construction that the generator may have a high capacity and yet remain in effective operating condition after considerable railway transportation.

Another object of the invention is to provide a steam generator of high capacity and high efficiency, operating at high rates of combustion with a minimum expenditure of auxiliary power particularly for forced draft. In accomplishing this object, the heat absorbing surfaces which are subject to furnace gases, are arranged for a single pass gas flow with optimum close spacing of the heat absorbing tubes to effectively absorb heat while avoiding excessive draft loss which might otherwise result if multiple gas passes were employed with gas turning baffles. Additionally, such close spacing of the heating surface tubes is permissible inasmuch as the major portion of the downcomer tube surfaces is shielded from direct impingement of the hot products of combustion.

A further object of the invention is to provide a water tube steam generator of such construction that it will efficiently operate after numerous movements to new sites, and without the necessity of providing a permanent foundation.

The various features of novelty which characterize the invention are pointed out in the claims annexed to and forming a part of this specification, but for a better understanding of the invention, and the specific objects attained by its use, reference should be had to the accompanying drawings and descriptive matter in which there is illustrated and described a preferred embodiment of the invention.

Figure 1:
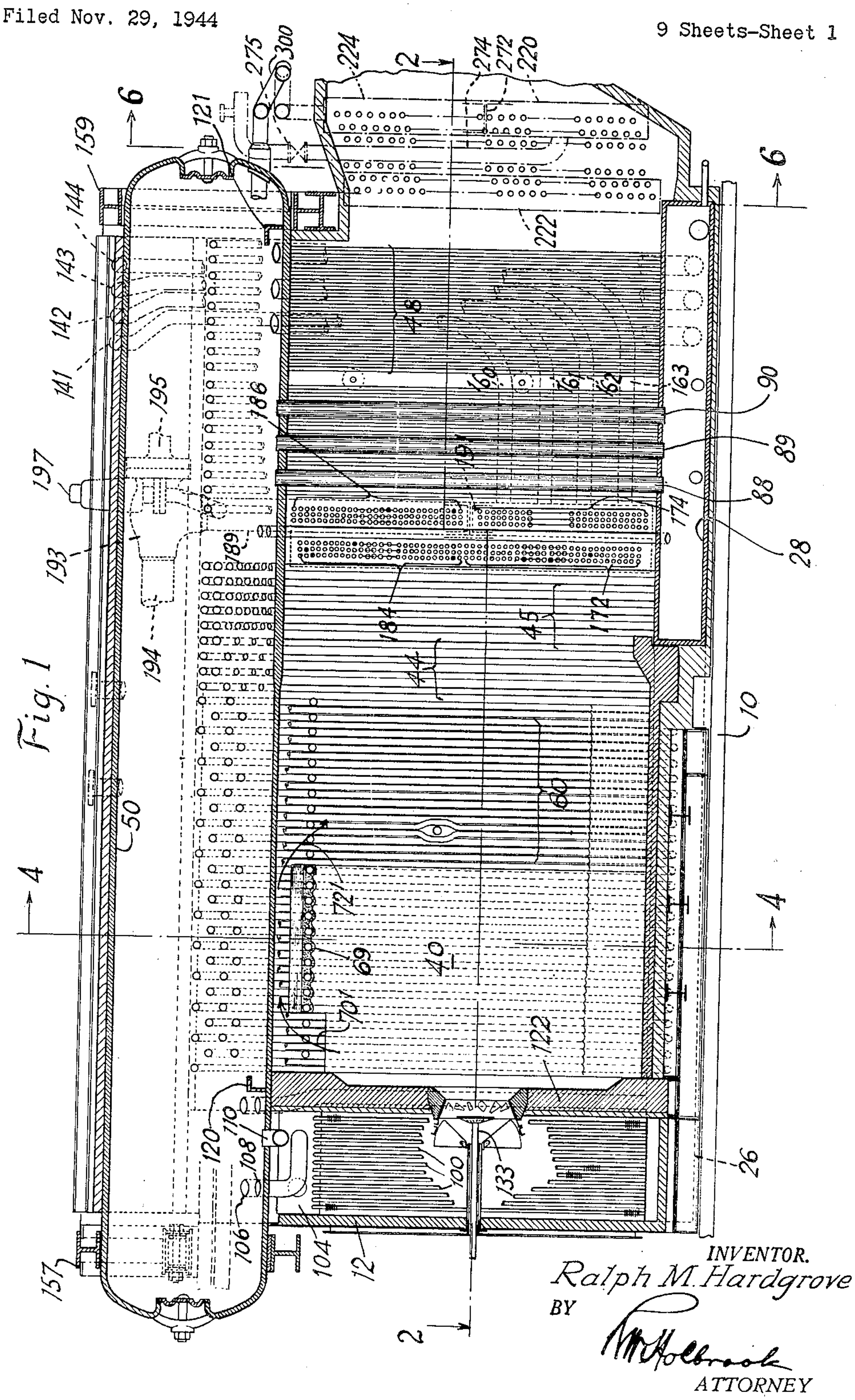
Fig. 1 is a sectional elevation of the illustrative steam generator on the line 1—1 of Fig. 2.

The illustrative steam generator is provided for furnishing steam as a part of a complete power plant of high capacity, and it is so constructed that it can be moved from point to point on existing railway facilities, as power may be required at different places. Such a power unit is of particular value in connection with the maintenance of adequate power supplies during war times when normal power supply may be interrupted. It is intended for use for a limited time in one locality and then for transportation for use at another locality. To facilitate such use, the installation is mounted for railway transportation and the steam generator is so structurally coordinated with the railway mount that the generator will maintain its operative characteristics even after the installation has been subjected to the usual hazards of railway movement.

Inasmuch as the steam generator is intended for use as a substitue for permanent steam generating installations, it is a desideratum that the capacity of the steam generator should be as great as possible, and the problems of attaining this characteristic were increased by the various railway limitations imposed. These are limitations of weight and space, as well as overall clearance limitations. The illustrative steam generator and its combined railway mount attains a high steam generating capacity while still keeping within these limitations. The problem of maintaining these conditions and still keeping the installation in operative condition after considerable transportation is aggravated by two additional factors springing from the structure of the steam generator construction. One is the high center of gravity of the natural circulation water tube steam generator employed. The other is the manner of supporting the steam generator from its steam and water drum which is at the top of the installation. This is particularly advantageous because of the weight of the drum and the construction of steam generating surfaces which does not readily permit of bottom support.

For attaining the above results, the illustrative installation includes a railway mount with heavy side girders or trusses having their lower chords at about the coupling level and their upper chords at a maximum elevation for supporting the drum of the steam generator. The ends of the drum are carried by transverse beam constructions rigidly secured to the upper chords of the side trusses. This desired condition is limited by the importance of having the steam generating tubes (extending downwardly from the drum) as long as possible in order to obtain the maximum steam generating capacity. To this end the illustrative installation has the pressure parts of the steam generator extending to a position within a few inches of the track level. In other words, the drum and the remaining pressure parts of the steam generator are set within a well between the trusses and the trucks of the railway mount, and their lower limits are close to the track level. The transverse beam constructions supporting the drum are advantageously located at positions near the ends of the well.

Figure 3:
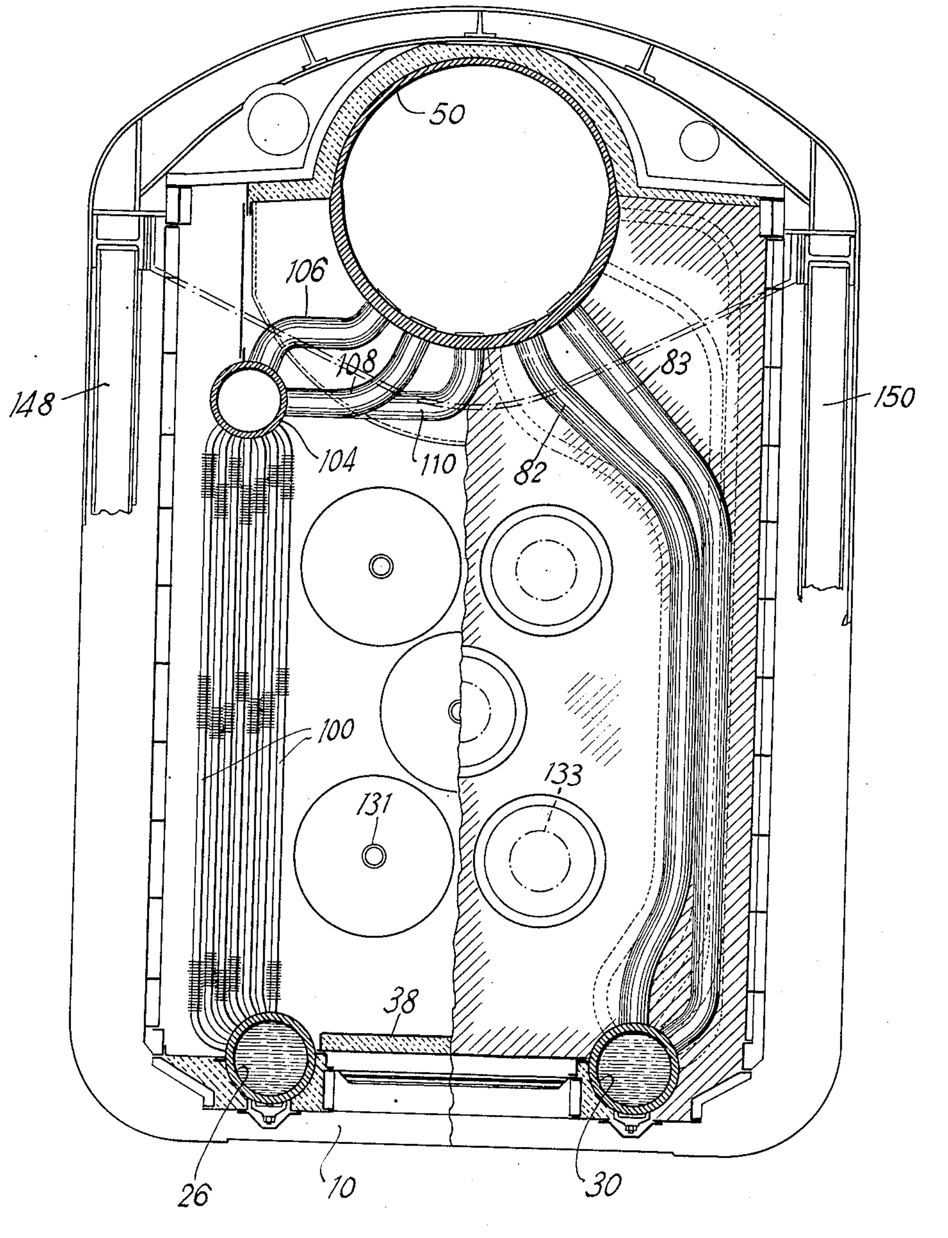
Fig. 3 is a vertical section on the line 3—3 of Fig. 2, one-half of this view taken in a vertical plane, offset from the vertical plane of the remainder of the view and showing the finned tubes of the air heater.
Figure 4:
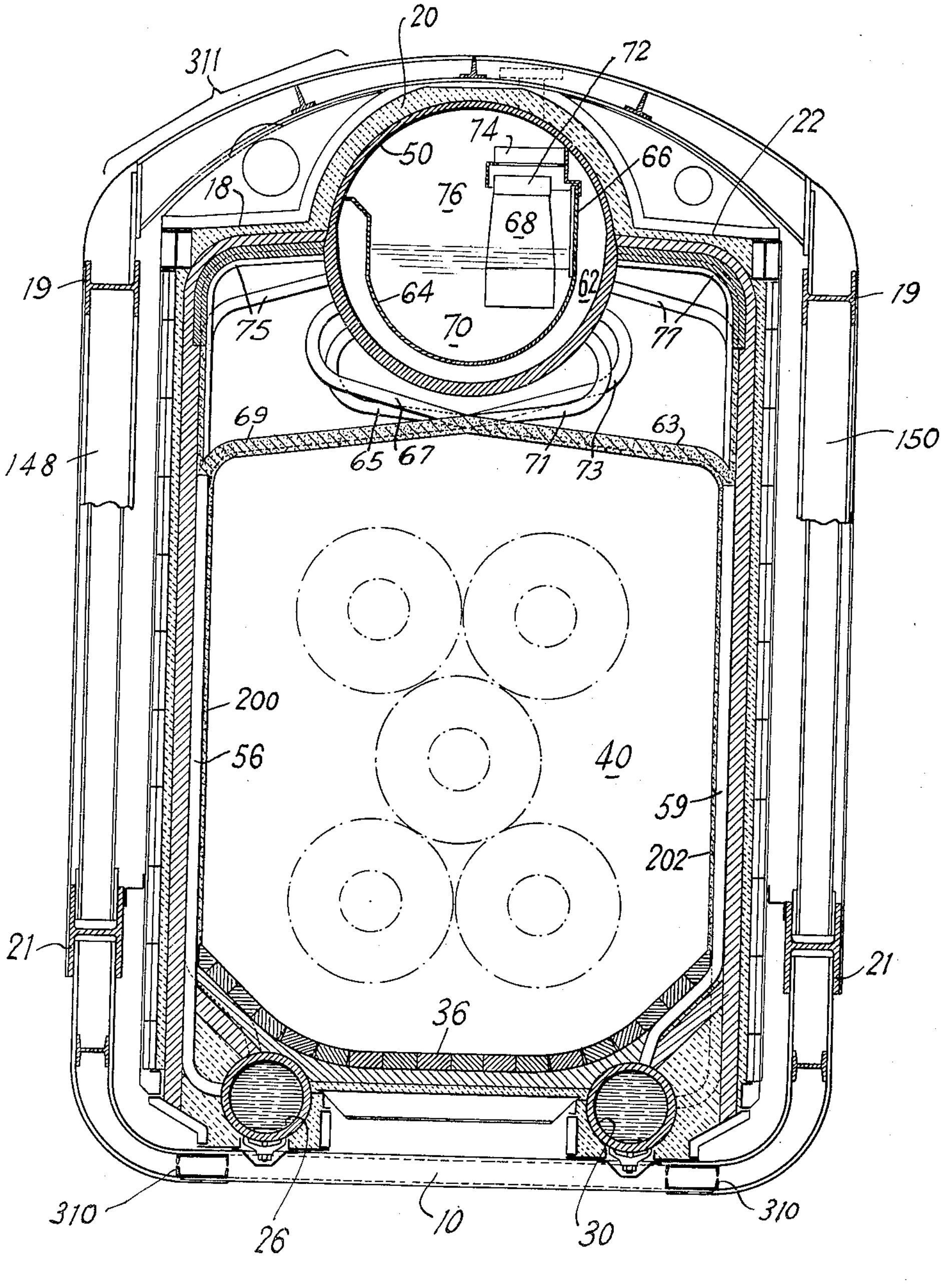
Fig. 4 is a vertical section on the line 4—4 of Fig. 1.
Figure 5:
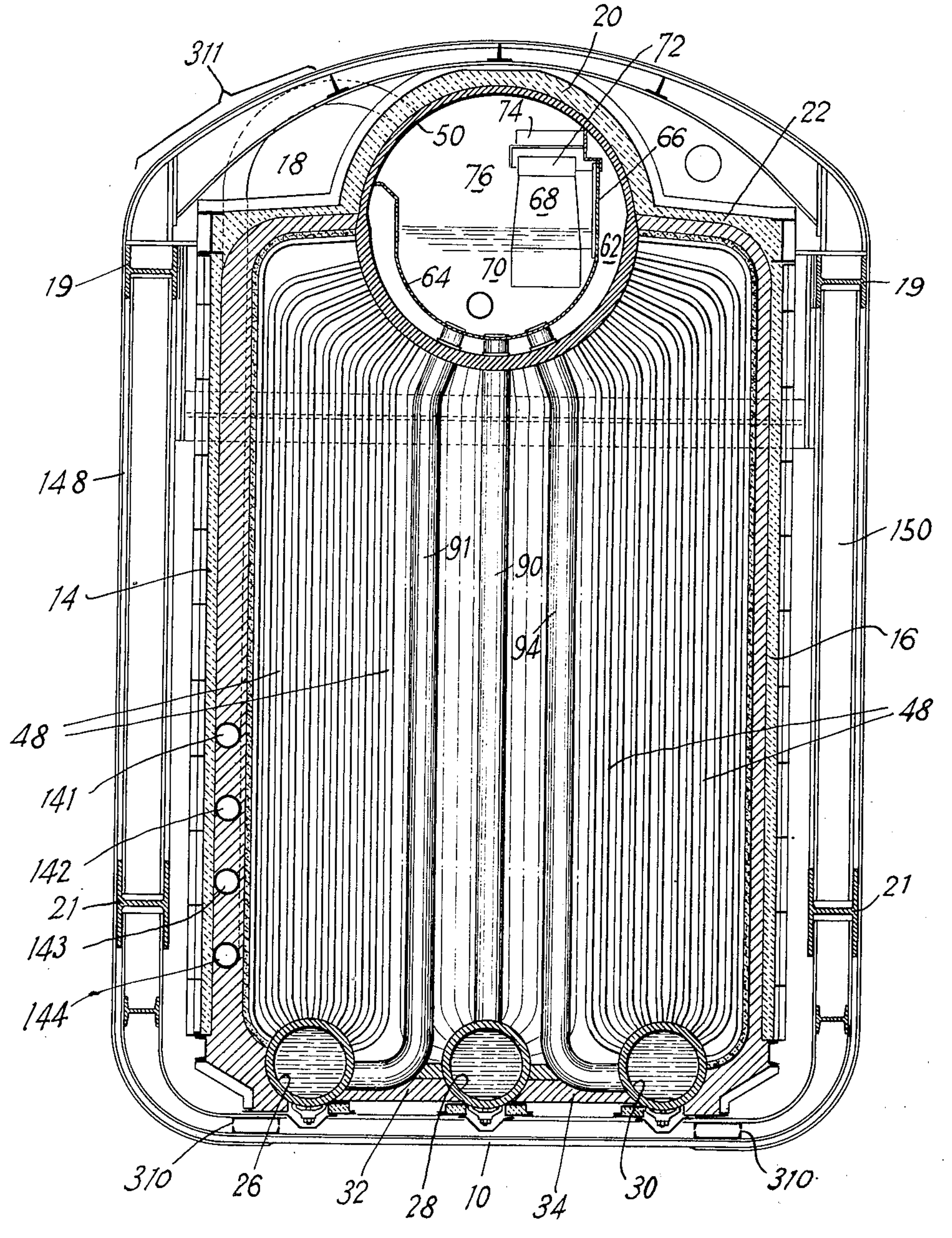
Fig. 5 is a transverse vertical section on the line 5—5 of Fig. 2.
Figures 10, 12:
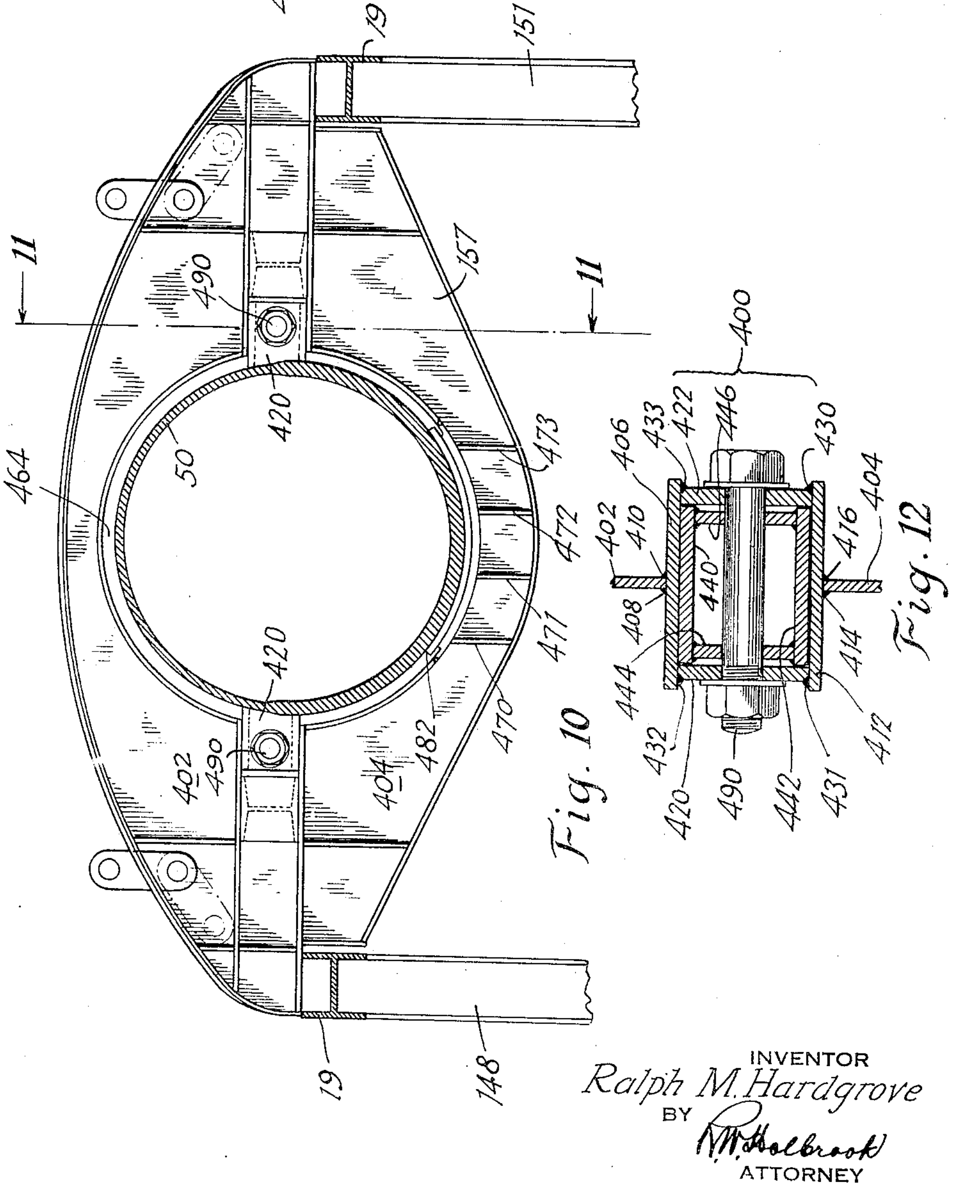
Fig. 10 is a view showing the structure for supporting the front end of the steam and water drum. This view is taken on a section, line 10—10 of Fig. 11, looking in the direction of the arrows.
Fig. 12 is a detail view showing the Fig. 11 trunnion construction on an enlarged scale.
Figure 14:
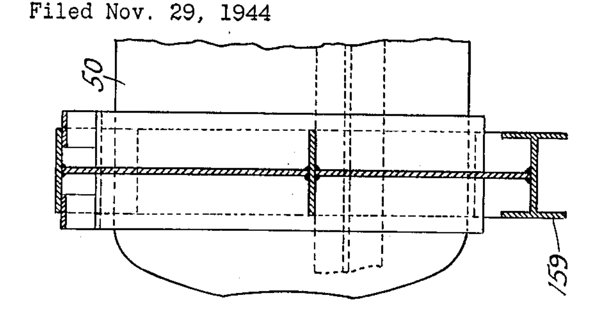
Fig. 14 is a vertical section taken on the line 14—14 of Fig. 13.
Figure 13:
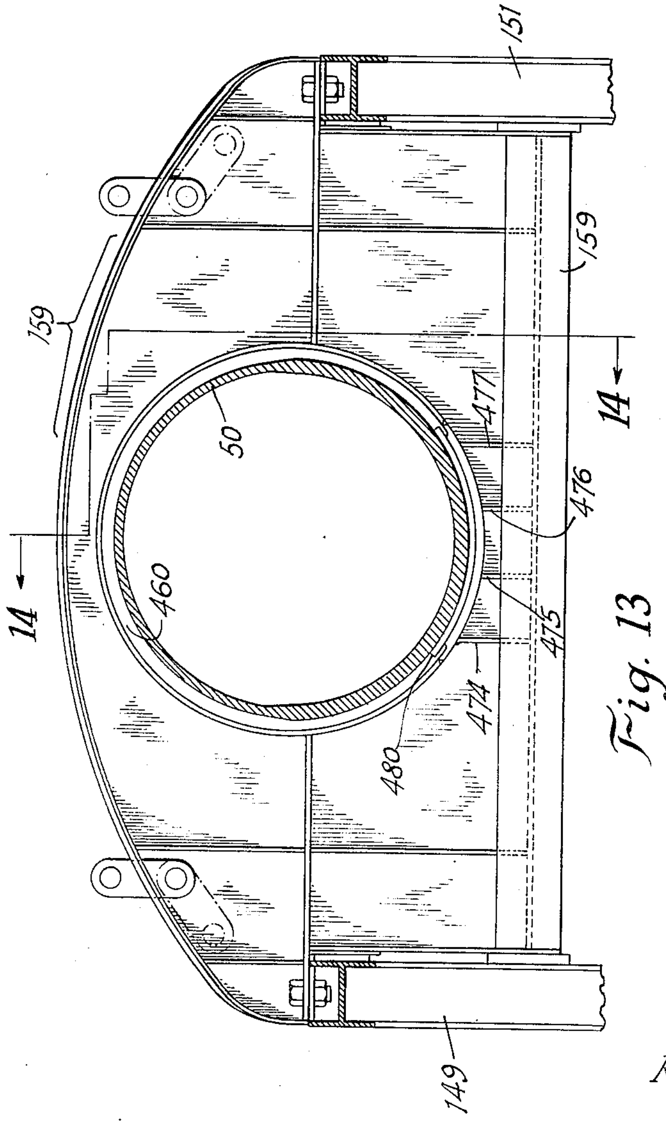
Fig. 13 is a partial elevation showing the support for the rear end of the drum.
Figure 15:
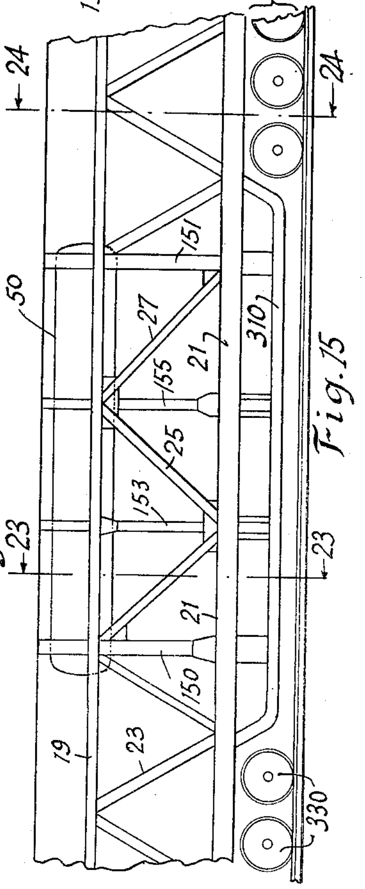
Fig. 15 is a diagrammatic view showing steel work for the boiler setting.

With this construction, and by reason of the fact that the side trusses provide the loading carrying members for the steam generator, these trusses may be considered a part of the steam generator setting which also includes the steam generator enclosing walls 11, 14, and 16; the roof sections 18, 20, and 22; and the steam generator furnace floor elements 26, 28, 30, 32, 34, 36, and 38 (Figs. 3, 4, and 5). One of the side truss constructions is indicated in Figs. 10, 13, and 15 of the drawings. It includes the upper chord 19 and the heavy lower chord 21, rigidly connected by diagonals such as 23, 25, and 27, and by uprights such as 150, 151, 153, and 155.

The side truss at the other side of the installation is similar to that just described and includes the uprights 148 (Fig. 3) and 149 (Fig. 13).

Within the boiler setting are the pressure parts of the installation, a substantial part of the total steam generating surface being formed by wall tubes of the combustion chamber 40. Other steam generating surface is formed by banks of upright steam generating tubes 44, 45, 47, and 48, the first of these banks being the bank of widely spaced screen tubes 44 disposed near one end of the combustion chamber. The tubes of the next rearward bank 45 are more closely spaced. These tubes connect the submerged headers 26, 28, and 30, directly to the steam and water drum 50 disposed at the upper part of the setting, as illustrated in the drawings.

The groups of steam generating wall tubes 55—60, inclusive, along the boundaries of the combustion chamber, directly connect the forward compartments of the side headers 26 and 30, with the steam and water inlet chamber 62 of the steam and water drum, as indicated, for example, in Fig. 4 of the drawings. This figure also indicates the manner in which some of the steam generating tubes, such as some of the tubes 55 and 59, converge inwardly at their upper ends to define the roof of the combustion chamber. For example, tubes at the right hand side of the combustion chamber form, with interposed refractory, the roof surface 63 with their upper parts, such as 65 and 67, extending underneath the drum and being connected to the drum 50 so as to directly communicate with the chamber 62, on its left hand side (Fig. 4). Tubes at the opposite side of the combustion chamber are similarly, but reversely, constructed and arranged to define the roof portion 69 and the drum connecting parts 71 and 73. Others of the wall tubes extend upwardly beyond the roof portions 63 and 69 and have their upper parts disposed as indicated at 75 and 77, and connected to the drum at positions above the tube portions 65 and 67, 71 and 73.

As indicated by the arrows 70' and 72' in Fig. 1 of the drawings, gases may pass over and around the roof portions 63 and 69. This is permitted by the construction whereby these roof portions do not extend throughout the entire length of the furnace.

Figure 2:
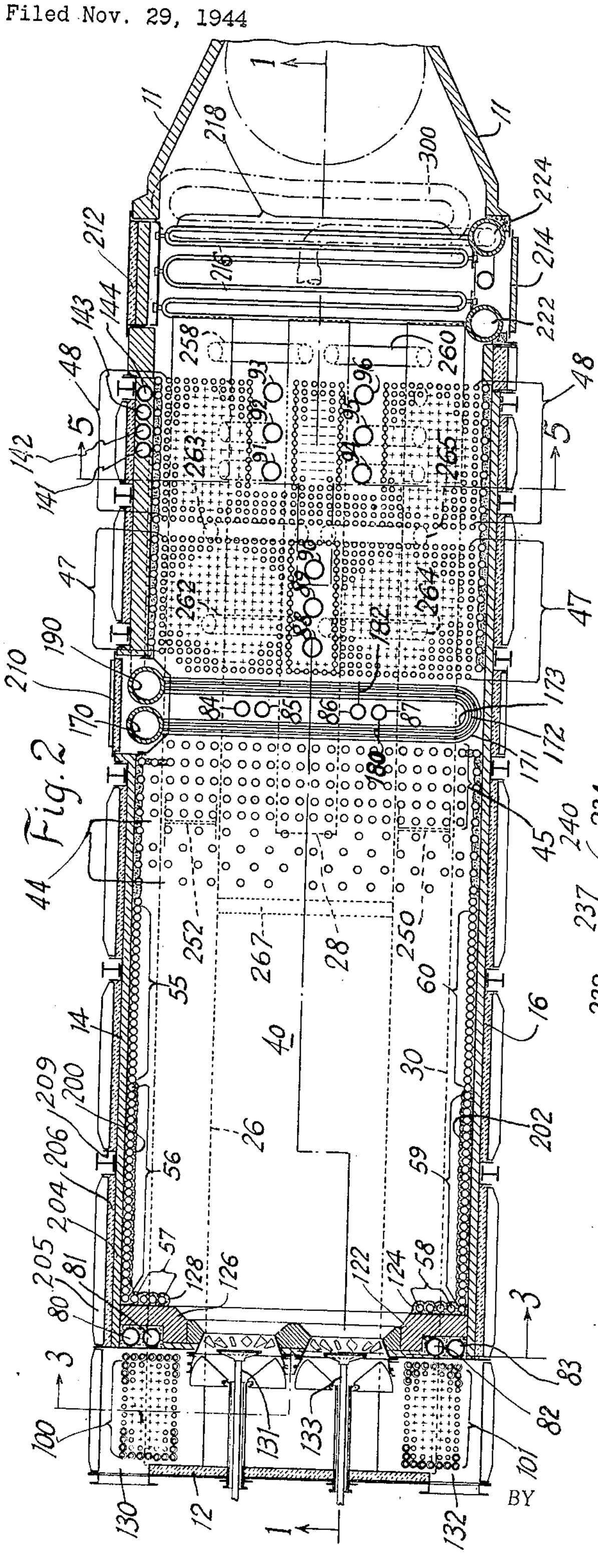
Fig. 2 is a horizontal section on the line 2—2 of Fig. 1.

As shown in Fig. 2, the wall tubes are thermally insulated exteriorly by the insulation strata 204 and 206, the latter of which are held in place by the panel constructions 205. These constructions include steel panels flanged outwardly along their margins for welding to the upstanding buckstay flanges 209. On the furnace sides of the groups of wall tubes 56 and 59 are the refractory strata 200 and 202.

The drum inlet chamber 62 is formed by the lower part of the drum and the main diaphragm construction 64, the ends of this inlet chamber being substantially closed by walls such as those indicated at 120 and 121 (Fig. 1). On one side of the drum, the diaphragm construction has an upright wall 66 to which are secured whirl chamber units 68 for centrifugally separating steam and water from the mixtures entering them tangentially through openings in the walls 66. These devices act to cause steam-free water to flow through the downcomers from the water space 70 of the drum. The separated steam flows upwardly from their outlets 72 and then through the multiple plate separators 74 into the steam space 76 of the drum.

To provide for adequate down-flow of separated water from the water space 70 of the drum, the installation includes a number of downcomers which directly connect the drum water space with the submerged headers 26, 28, and 30. Some of these downcomers are indicated in Fig. 2 by numerals 80—96, inclusive, and additional downcomer capacity is afforded by the banks of small finned air heater tubes 100 and 101 at the opposite sides of the fluid fuel burners 131 and 133 (Fig. 2).

Figure 16:
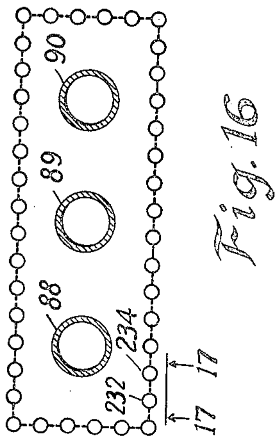
Fig. 16 is a detail view indicating in horizontal section the construction by which certain of the downcomers are shielded from impact of furnace gases.
Figure 17:
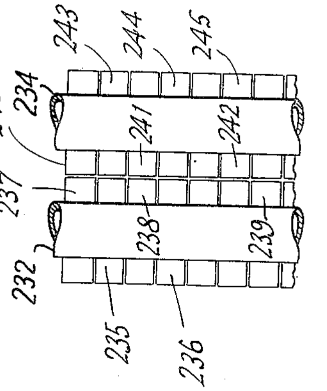
Fig. 17 is a detail view showing, in elevation, a fragmentary part of the wall construction by which certain of the downcomers are protected as indicated in Fig. 16.

Improved circulation conditions are afforded by a construction and arrangement which substantially eliminates gas impact upon the various downcomer groups consisting, respectively, of the downcomers 88—89—90, 91—92—93, 94—95—96. The downcomers 88—89—90 form a group disposed centrally of the bank of steam generating tubes 47, and the remainder of the downcomers immediately above mentioned form two groups disposed within the bank of tubes 48, all as clearly indicated in Fig. 2. Around the downcomers of each of these groups, steam generating tubes are omitted, so that the remaining steam generating tubes define a box-like enclosure about each group of downcomers, in the manner indicated in Figs. 16 and 17. To further complete this box-like enclosure and reduce, if not prevent, gas contact with the downcomers, the tubes defining the walls of this box-like enclosure have closely adjacent wing studs extending from diametrically opposite sides thereof and arranged as indicated at 235—245 in Fig. 17. Similar constructions enclose the separate groups of downcomers, including the tubes 91—92—93 and 94—95—96, respectively. The downcomers 84—85—86—87 are protected from the direct heat of the furnace by the superheater tubes (to be later referred to), by the bank of tubes 45 disposed immediately in front of superheater, and by the bank of screen tubes 44.

The downcomers 82 and 83, indicated in the lower left hand corner of Fig. 2 are protected from furnace gas contact, and from radiant heat from the furnace, by a relatively thick refractory wall 122. Additional protection is afforded by the adjacent steam generating wall tubes 58 and their refractory covering 124. Similarly, the downcomers 80 and 81 indicated at the upper left hand corner of Fig. 2, are protected by the refractory wall 126, the tubes 57, and the refractory tube covering 128. Additional downcomers, formed by the banks of finned air heater tubes 100—101 are cooled by air entering the inlets 130 and 132 and passing over the tubes and their fins to the burners 131 and 133.

Fig. 3 shows the arrangement including the bank of air heater tubes 100. These finned tubes are connected at their lower ends to the header 26 and have their upper ends connected to a short header 104, from which the large diameter downcomer connections 106, 108 and 110 extend to the water space of the drum 50 beyond the end wall of the drum inlet chamber 62. The bank of air heater tubes 101 at the opposite side of the steam generator is similarly connected to the drum 50.

That section of the installation, including the steam generating tubes immediately bordering combustion chamber 40 may be considered as indicating the radiation section, while that section of the installation, including the banks of steam generating tubes, 45, 47, and 48 may be considered as indicating the convection section. To prevent the convection section from robbing the steam generating tubes of the radiation section of an adequate water supply to the inlets of the steam generating tubes, the intermediate submerged header 28 is used only for the convection section and the side headers 26 and 30 are divided into forward and rearward compartments by the diaphragms 250 and 252. The forward compartments of these headers may be considered as acting only for the radiation section.

The lower portions of the tubes of the bank 44 are divergently bent so that they enter the forward portions of the side headers, while the rearward banks of tubes of the convection section are directly connected to all of the lower headers.

The downcomers disposed rearwardly of the bank of tubes 45 are connected to the intermediate and side headers, and circulation conditions between these headers are equalized by connecting tubes, such as those indicated at 258 and 260 in Fig. 2. The tube 258 is an equalizer tube connecting the headers 26 and 28, whereas the tube 260 connects the headers 28 and 30. Other equalizing tubes, 262—265, inclusive, and 267 similarly connect the submerged headers at positions forwardly of the equalizers 258 and 260.

The illustrative steam generating unit is preferably provided with forced draft blowers discharging air into the air heater inlets 130—132 (see Fig. 2) so that sufficient pressure is developed at these points to overcome the air pressure drop through the air heater downcomer tubes, and the pressure drops through the convection steam generating section, the superheater, and the economizer.

Under these conditions, the steam generator will be operated at a substantially super-atmospheric pressure, and in order to maintain gas tightness and to avoid destructive outward leakage of gases, the casing for the installation is made of gas tight welded construction substantially throughout.

Figures 6, 7, 8, 9:
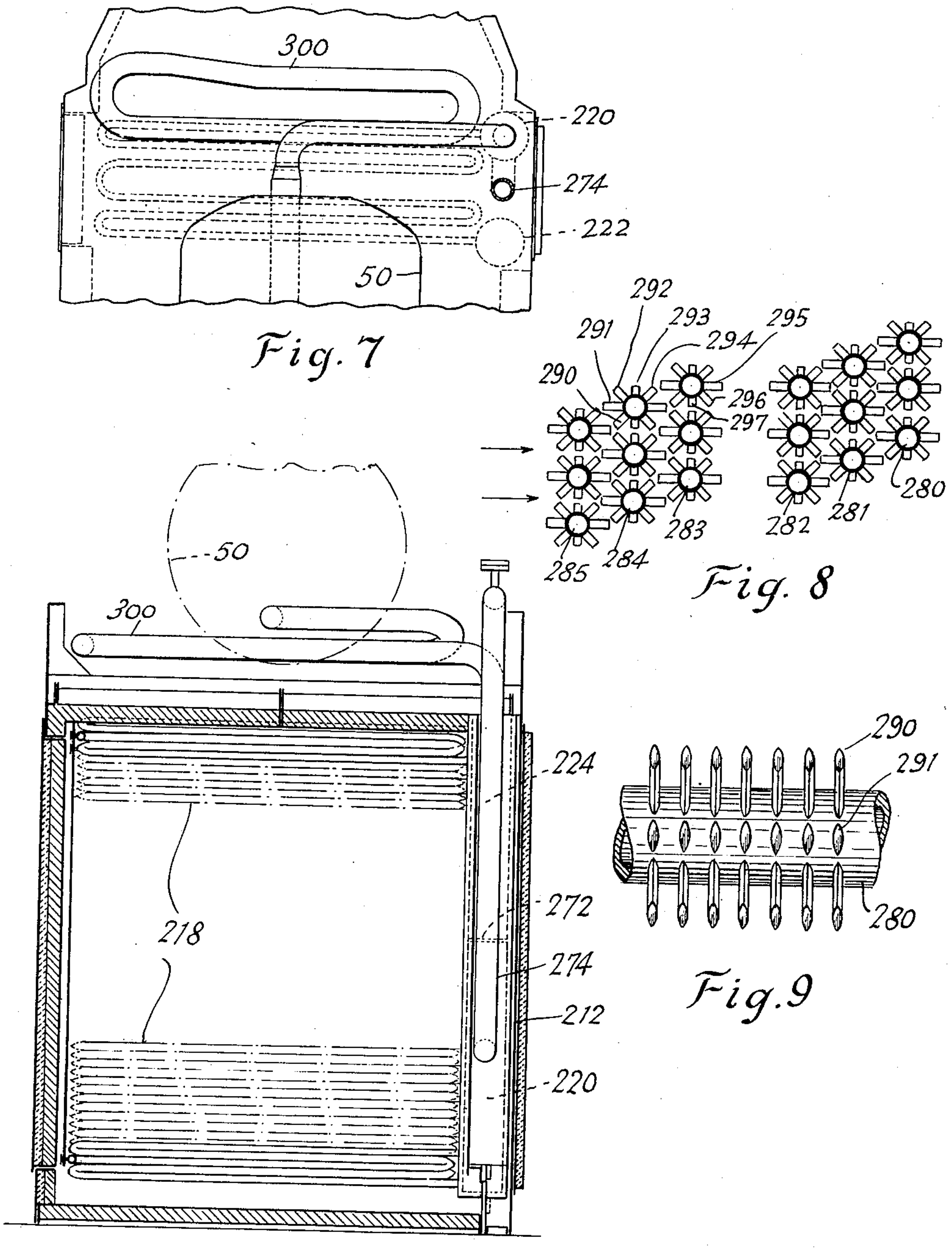
Fig. 6 is a view of the nature of vertical section on the line 6—6 of Fig. 1 showing the arrangement of the economizer tubes and headers, and the economizer looped outlet connection to the steam and water drum.
Fig. 7 is a fragmentary plan showing the economizer end of the steam and water drum and the looped economizer outlet connection to the drum.
Fig. 8 is a partial vertical section showing the arrangement of the economizer tubes with their extended surface elements.
Fig. 9 is a partial elevation of an economizer tube with its extended surface elements.

The economizer 218 is disposed rearwardly of the bank of tubes 48. It includes a header having upper and lower compartments separated by a diaphragm 272. The lower compartment 220 acts as the inlet chamber of the economizer, receiving feed water through the tubular connection 274 which leads from the valve 275. Forwardly of the inlet compartment 220 is the intermediate header 222 which is disposed somewhat lower than the header forming the inlet and outlet compartments 220 and 224. The flow of water from the inlet compartment 220 takes place through flat coils of return bend tubes each of which is similar to the coil indicated at 216 in Fig. 2. These coils have successive parallel tube lengths such as those indicated at 280—285 in Fig. 8, and the plane of each flat coil is inclined downwardly from the header having inlet compartment 220 to the intermediate header 222. Thus, the first section of the economizer is so constructed that it is operated on the counterflow principle, the flow of water within the tubes being counter to the flow of furnace gases exteriorly of the tubes.

The remaining section of the economizer is formed by similar flat coils of return bend tubes having their inlet ends connected to the upper part of the intermediate header 222, and their outlet ends connected to the outlet compartment 224. These coils are also inclined in a manner similar to the inclination of the coils directly connected to the compartment 220.

For giving a high ratio of exterior heating surface to the interior economizer surface in contact with the fluid to be heated, the economizer tube lengths have extended surface elements such as 290—297 welded thereto. These extended surface elements are of streamlined cross section providing a high ratio of gas contacting surface to draft loss, thereby effectively utilizing the heat of the gases in heating the fluid within the economizer tubes.

The outlet compartment 224 of the economizer is connected to the drum 50 by tubular connections including the loop 300 which eliminates excessive stresses upon the connections or upon the supports for the economizer headers.

To provide for inspection or replacement of the economizer elements the steam generator casing is provided with detachable panels such as those indicated at 212 and 214. These panels are normally secured to the casing in gas tight relationship.

The superheater is of the convection type including nested U-tubes such as 171, 172, and 173 (Fig. 2). The parallel legs of these U-tubes form straight tube lengths supported by vertical plates such as 180 and 182 secured to the upright downcomers 86 and 87. The lower U-tubes connect the superheater header inlet compartment 191 (Fig. 1) of the header 190 to the intermediate superheater header 170, the two superheater headers being disposed alongside each other upon the same side of the installation as indicated in Fig. 2 of the drawings. Steam is conducted to the inlet compartment 191 of the superheater by such tubular connections as those shown at 160—163 in Fig. 1. The upper parts 141—144 of these connections are in communication with the steam space of the drum 50. The first legs of the U-tubes connected to the inlet compartment 191 form a lower bank of tubes 174 and the flow of steam is from this bank of tubes 174 and the flow of steam is from this bank into the bank of tubes 172 formed by the remaining legs of these U-tubes. Thus, steam is conducted to the intermediate header 170. From the upper part of this header steam flows through a bank of tubes 184 formed by the first legs of the U-tubes of the upper part of the superheater. The flow is then to the remaining legs of these U-tubes, forming the bank of tubes 186. The outlet ends of these tubes are connected to the outlet compartment at the upper part of the superheater outlet header 190 and from this header the steam flows through a tubular connection 189 leading to a T 193. One branch 194 of this T 193 leads to the turbine, and an opposite branch 195 leads to the auxiliaries associated with the installation. Also connected to the T 191 is a superheater safety valve 197.

The drum 50 is supported upon trunnion mountings at its forward end, this end of the drum being fixed so that the drum expands from that position rearwardly. Each trunnion mounting is indicated generally by the numeral 400 in Figs. 11 and 12, there being a trunnion mounting at each side of the drum. Each mounting is interposed between the upper and lower parts, 402 and 404, respectively, of the web of the transverse beam construction 157. The upper web 402 is welded to a plate section 406 as indicated at 408 and 410 in Fig. 12 and a lower plate 412 is similarly welded at 414 and 416 to the lower web part 404. Between the plates 406 and 412 are the parallel plate sections 420 and 422 welded to the plates 406 and 412 at 430—433. Disposed within the supports thus formed are hollow built-up beam-like constructions secured to opposite sides of the drum. Each of the latter includes the upper and lower plate sections 440 and 442 welded at their inner ends to the drum 50, and the associated upright plate sections 444 and 446 which are welded to the plate sections 440 and 442 as shown in Fig. 10, and are also welded at their ends to the drum.

Figure 11:
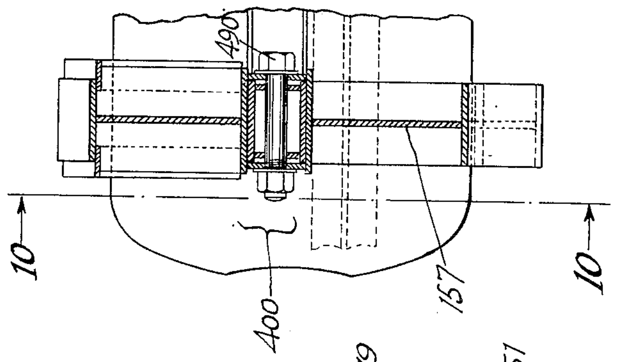
Fig. 11 is the longitudinal vertical section taken on the line 11—11 of Fig. 10, and looking in the direction of the arrows.

Extending through aligned openings in the plates 420, 422, 444, and 446 of the trunnion constructions are bolts 490, as indicated in Figs. 10, 11, and 12.

The transverse beam-like constructions 157 and 159 of the setting steel work have circular openings 460, 464 for receiving the drum, and the central parts of these beam constructions (Figs. 10 and 13) beneath the drum are reinforced by the ribs 470—477, inclusive. Above these reinforced parts are arcuate pads 480 and 482 upon which the drum rests.

Figure 18:
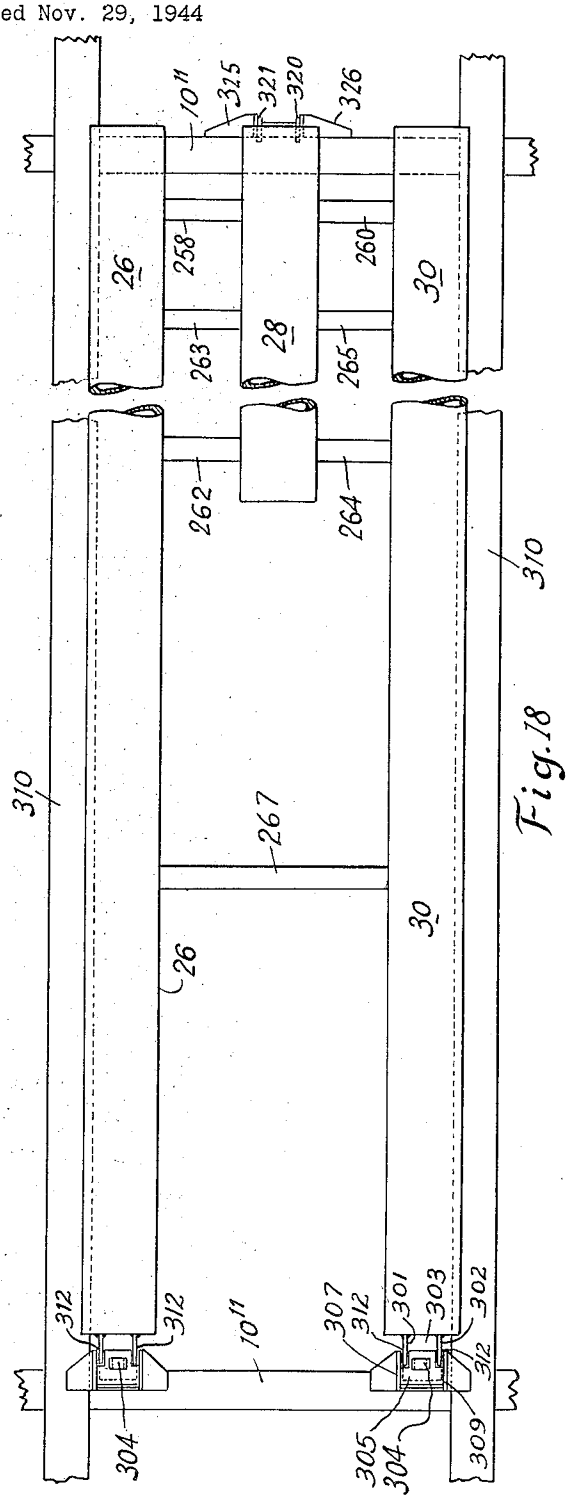
Fig. 18 is a diagrammatic plan showing the arrangement of the lower headers relative to the car construction.
Figure 20:
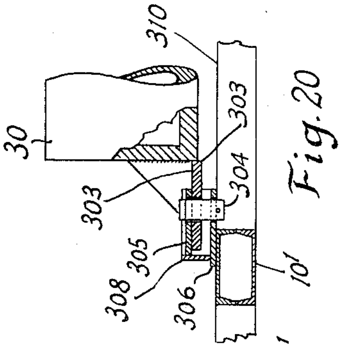
Fig. 20 is a vertical section of the line 20—20 of Fig. 19.
Figure 19:
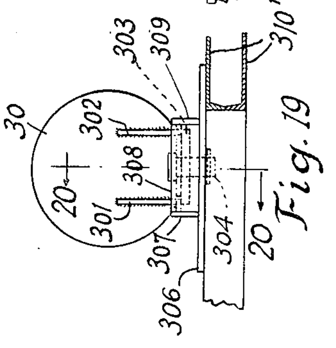
Fig. 19 is an elevation of the structure at the left hand end of one of the longer water headers of Fig. 18.

The lower part of the steam generator also has its forward end secured to the steel work so that it may expand rearwardly from that position. For this purpose and also to prevent any side sway of the lower part of the steam generator relative to the steel work, the forward ends of the headers 26 and 30 are secured to the steel work as indicated in Figs. 18–20, inclusive. As here shown, the forward end of each of these headers has welded thereto two upright gusset plates 301 and 302 with their lower horizontal portions welded to the base plate 303. The latter is provided with a central aperture to receive a pin 304 which also extends through aligned openings in the upper and lower plates 305 and 306, respectively, of a fixed guide block construction secured to the steel work. As indicated in Figs. 19 and 20, the upper and lower plates 305 and 306 are spaced vertically so as to provide for vertical movement of the movable guide block plate 303 therebetween. This permits the lower part of the boiler to freely move vertically within narrow limits as the temperature of the pressure parts of the steam generator changes.

The upper plate 305 of the fixed guide block construction is welded to upright enclosing plates 307, 308, and 309 which are, in turn, welded together, and welded at their lower edges to the base plate 306.

The base plate 306 is fixed to one of the transverse members 10′ of the steel work. These transverse members extend underneath the pressure parts of the steam generator as indicated at 10 in Figs. 4 and 5 and they are rigidly secured at their ends to the heavy chords 21 of the car side constructions.

The base plate 306 for the guide block constructions shown in Figs. 19 and 20 also may be secured to the longitudinal steel work components such as 310. As indicated in the drawings, these components may consist of channel sections 310′ rigidly secured together. Preferably, their are bent upwardly at their ends so as to be anchored to the lower truss chords 21. They extend beneath the steam generator where they are joined to the transverse members 10 in a manner indicated in Fig. 4. The upper part of the installation is similarly strengthened by the transversely extending steel work components 311 which are rigidly secured at their ends to the upper chords 19 of the side truss constructions. Preferably, the roof of the installation is formed by plates secured to the members 311.

Referring back to constructions shown in Figs. 18–22, inclusive, side sway of the lower part of the steam generator relative to the steel work is prevented by the pins 304 passing vertically through the guide block constructions between the forward ends of the headers 26 and 30 and the transverse member 10'. Limited vertical movement of the headers 26 and 30 is permitted by the spacing of the upper and lower guide block plates 305 and 306, and during any such movement the gusset plates 301 and 302 move vertically within slots 312 in the fixed guide block plates 305.

Figure 22:
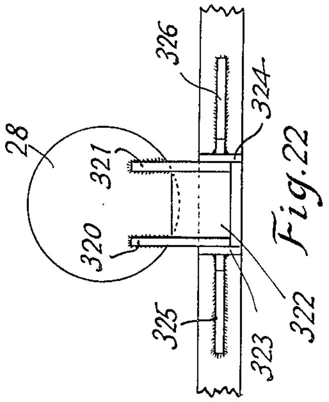
Fig. 22 is an end elevation of Fig. 21.
Figure 21:
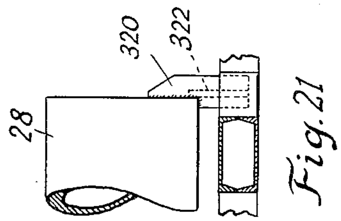
Fig. 21 is a fragmentary side elevation of the structure at the right hand of the intermediate header of the Fig. 18 arrangement.

Figs. 18, 21, and 22 also indicate a guide block construction secured to the rear end of the intermediate header 28 and the transverse steel work member 10''. This construction prevents side sway at the rear end of the boiler construction relative to the car frame, but permits relative vertical and horizontal movements resulting from expansion and construction of the headers or other pressure parts. One of these guide block constructions is sufficient at this end of the steam generator because of the pressure parts such as the equalizer tubes 258, 260, 262, 263, 264, and 265, rigidly joined to the headers 26, 28, and 30.

The guide block construction at the rear end of the header 28 consists of vertical plate sections 320 and 321 having their upper parts welded to the header as indicated in Figs. 21 and 22. These plate sections are joined by transverse web 322 disposed as indicated in Figs. 21 and 22.

As the pressure parts of the steam generator are subject to temperature changes, the lower ends of the plate sections 320 and 321 may be moved vertically or horizontally in a guide way formed by the upright bar or plate elements 323 and 324. These elements are preferably welded to the vertical face of the transverse steel work member 10'' and are further held in their operative positions by the horizontal gusset plates 325 and 326 disposed in the angles between the vertical face of the member 10'' and the elements 323 and 324 and preferably welded thereto.

Figure 24:
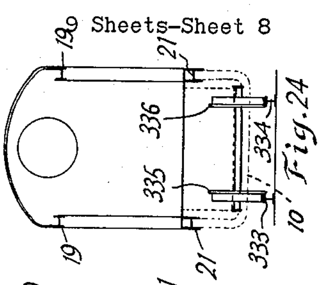
Fig. 24 is a vertical transverse section on the line 24—24 of Fig. 15.
Figure 23:
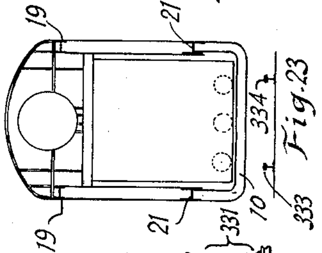
Fig. 23 is a vertical transverse section on the line 23—23 of Fig. 15.

The relationships of the railway car components to the pressure parts of the steam generator are further indicated in Figs. 15, 23, and 24. Fig. 15, in particular, shows the construction by which pressure parts of maximum overall height may be utilized. This is permitted by the disposition associated pressure parts of the steam generator in a well between the railway car trucks 330 and 331, the bottom of the well construction being indicated by the disposition of the horizontal steel work components 310 beneath the side trusses extending from one railway truck to the other. Between the trucks the bottom of the installation is close to the track level, or the tops of the rails 333 and 334. At the ends of the installation the car construction with its floor at the level of the lower chords 21 is indicated in Fig. 24. Here, the truck wheels as indicated at 335 and 336 are below the car floor level.

What is claimed is:

1. In a steam generator; a steam and water drum; a furnace, a superheater, and a steam generating convection section, all arranged in series beneath the drum and longitudinally thereof; longitudinally arranged side headers and an intermediate header adjacent the base of the generator and extending along the convection section, the convection section including a bank of spaced upright steam generating tubes extending from the headers to said drum and arranged on opposite sides of a space free from such tubes; means including a first set of downcomers connecting the side headers to the water space of the drum in the furnace zone, means including a second set of downcomers connecting the water space of the drum to said longitudinally arranged headers in the convection zone, at least some of said downcomers being disposed in the space which is free from upright steam generating tubes, furnace wall tubes connected to the side headers and the drum and constituting parts of a furnace circulatory system which includes the first set of downcomers, the circulating system for the convection section including the bank of upright steam generating tubes and the second set of downcomers, transverse diaphragms secured intermediate the lengths of the side headers and separating front header sections for the furnace circulatory system from rear header sections for the convection section circulating system, and extended surface elements projecting laterally from said convection section steam generating tubes bordering said space to form an enclosing wall substantially shielding said space and the downcomers therein from oncoming furnace gases.

2. A steam generator comprising a horizontally elongated casing enclosing a longitudinal steam and water drum, a longitudinal water drum therebeneath, a bank of upright water tubes between and communicating with said drums, a combustion chamber in front of the tube bank, longitudinal headers on opposite sides of the combustion chamber and having rear portions at opposite sides of said water drum, downcomer tubes located within said tube bank with their upper ends connected to the bottom of said steam and water drum close to the vertical axial plane thereof, the lower ends of said downcomer tubes being connected to the rear portions of said headers, and upright water wall tubes adjacent the side walls of the combustion chamber with their lower ends connected to the headers and their upper ends communicating with the stream and water drum.

3. A steam generator comprising a longitudinal steam and water drum, a longitudinal water drum therebeneath, a bank of upright water tubes connecting the drums and arranged to leave a space free from such tubes in a region located a substantial distance rearwardly from the front of the tube bank, walls providing a combustion chamber in front of the tube bank, longitudinal headers on opposite sides of the combustion chamber, downcomer tubes located within the said space with their upper ends connected to the bottom of the upper drum close to the vertical axial plane thereof, the lower ends of the downcomer tubes being connected to the rear portions of the headers, and upright water wall tubes adjacent the side walls of the combustion chamber with their lower ends connected to the headers and their upper ends communicating with the steam and water drum.

4. A steam generator comprising a horizontally elongated casing enclosing a longitudinal steam and water drum, a longitudinal water drum therebeneath, a bank of upright water tubes between and communicating with said drums, said tubes being arranged to embrace a space free from steam generating tubes within the upright confines of the bank of tubes, a combustion chamber in front of the tube bank, longitudinal headers on opposite sides of the combustion chamber and having rear portions at opposite sides of said water drum, downcomer tubes located within said space with their upper ends connected to the bottom of said steam and water drum close to the vertical axial plane thereof, the steam generating tubes of said bank immediately bordering said space having closely arranged metallic extended surface elements secured thereto and arranged to form an enclosure shielding the downcomers, the lower ends of said downcomer tubes being connected to the rear portions of said headers, and upright water wall tubes adjacent the side walls of the combustion chamber with their lower ends connected to the headers and their upper ends communicating with the steam and water drum.

5. A steam generator comprising a longitudinal steam and water drum, a longitudinal water drum therebeneath, a bank of upright water tubes connecting the drums and arranged to leave a space free from such tubes in a region located a substantial distance rearwardly from the front of the tube bank, walls providing a combustion chamber in front of the tube bank, longitudinal headers on opposite sides of the combustion chamber, downcomer tubes located within the said space with their upper ends connected to the bottom of the upper drum close to the vertical axial plane thereof, the upright water tubes bordering said space being provided with laterally projecting metallic extended surface elements which combine with the tubes to form an enclosure shielding the downcomers within said space, the lower ends of the downcomer tubes being connected to the rear portions of the headers, and upright water wall tubes adjacent the side walls of the combustion chamber with their lower ends connected to the headers and their upper ends communicating with the steam and water drum.

RALPH M. HARDGROVE.

REFERENCES CITED

The following references are of record in the file of this patent:

UNITED STATES PATENTS

| Number | Name | Date |
|---|---|---|
| 857,723 | Connor | June 25, 1907 |
| 1,168,880 | Guibert | Jan. 18, 1916 |
| 1,677,749 | Crane | July 17, 1928 |
| 1,699,864 | Van Pagenhardt et al. | Jan. 22, 1929 |
| 1,804,939 | Kerr | May 12, 1931 |
| 1,827,201 | Kerr | Oct. 13, 1931 |
| 1,852,302 | Hartmann | Apr. 5, 1932 |
| 1,860,495 | Doerner | May 31, 1932 |
| 1,946,221 | Loutz | Feb. 6, 1934 |
| 2,109,277 | Schmidt | Feb. 22, 1938 |
| 2,222,530 | Davey | Nov. 19, 1940 |
| 2,271,639 | Hardgrove | Feb. 3, 1942 |
| 2,292,354 | Artsay | Aug. 11, 1942 |
| 2,318,040 | Woodard et al. | May 4, 1943 |
| 2,412,568 | Donahue et al. | Dec. 17, 1946 |
| 2,435,055 | Rehm | Jan. 27, 1948 |